Figure 1A:
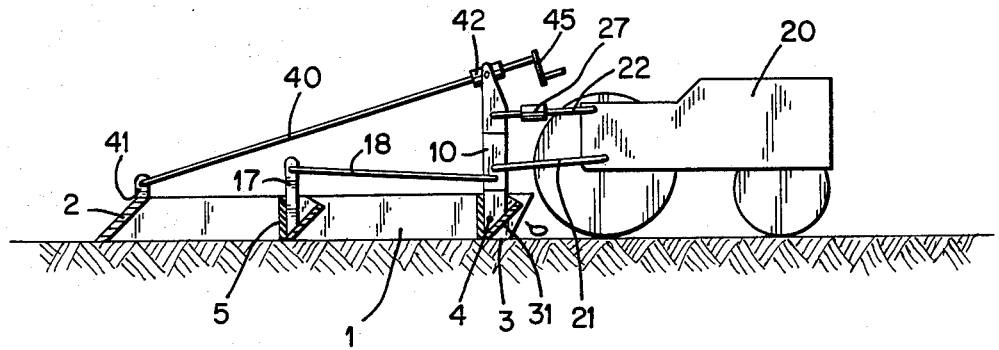

United States Patent [19]

Kalif

[11] 4,386,662

[45] Jun. 7, 1983

[54] LEVELER FRAME ATTACHED TO AN AGRICULTURAL TRACTOR

[76] Inventor: Aitan Kalif, 20b, Yehoshua St., Afula, Israel

[21] Appl. No.: 266,106

[22] Filed: May 21, 1981

[30] Foreign Application Priority Data

Dec. 22, 1980 [IL] Israel ........................................ 61788

[51] Int. Cl.³ ............................................. A01B 49/02
[52] U.S. Cl. ................................... 172/445.1; 172/780
[58] Field of Search ............... 172/445.1, 445.2, 799.5, 172/779, 780, 684.5

[56] References Cited

U.S. PATENT DOCUMENTS

| | | | |
|---|---|---|---|
| 1,845,324 | 2/1932 | Noffsinger | 172/780 |
| 2,346,757 | 4/1944 | Horner | 172/445.1 |
| 2,428,857 | 10/1947 | Smith | 172/445.1 |
| 2,994,977 | 8/1961 | Shumaker | 172/445.1 |
| 3,145,489 | 8/1964 | Smith | 172/445.1 |
| 3,534,821 | 10/1970 | Mitchel | 172/780 |
| 3,889,760 | 6/1975 | Manor | 172/780 X |
| 4,236,586 | 12/1980 | Shader | 172/780 |

Primary Examiner—Richard J. Johnson

Attorney, Agent, or Firm—Schwartz, Jeffery, Schwaab, Mack, Blumenthal & Koch

[57] ABSTRACT

A leveler frame is attached to the three-point linkage of an agricultural tractor and serves to break up earth clods by vibrating action of its inclined blades. The implement comprises two lateral members and three cross members in the shape of one fixed inclined blade at the rear end of the frame and two vibrating blades pivotally fastened to the lateral members, one at the front end and one in the center of the frame. The pivoted blade at the front end is rigidly connected to an upstanding lever member which serves to attach the leveler frame to the parallel upper and lower linkage arms by means of vertically spaced pivots on the lever member. The second vibratory, pivoted blade—which is not obligatory—is connected to the upstanding lever by a link extending parallel to the lateral members. During travel of the tractor across a roughly plowed field the frame is trailed behind by the freely swinging linkage arms; while the tractor wheels rise and drop alternately while passing over the uneven ground, they actuate the pivoted blade or blades by movement of the linkage arms, whereby earth clods are comminuted and the soil surface is smoothed.

8 Claims, 5 Drawing Figures

U.S. Patent  Jun. 7, 1983  Sheet 2 of 2  4,386,662
FIG. 2
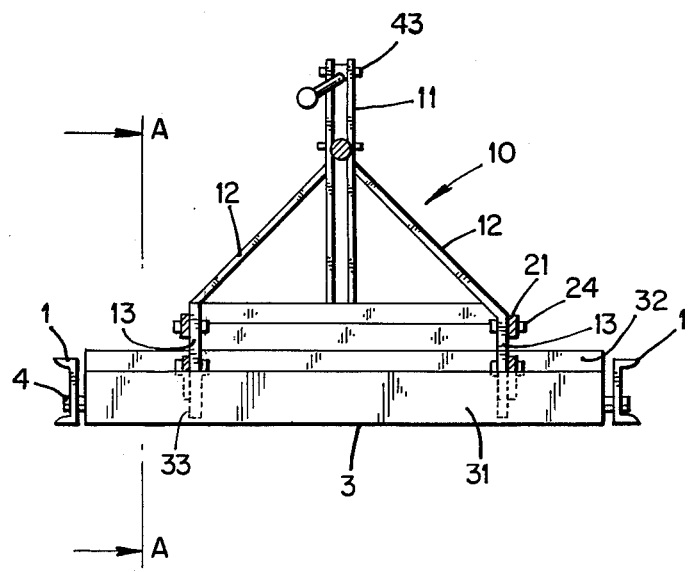
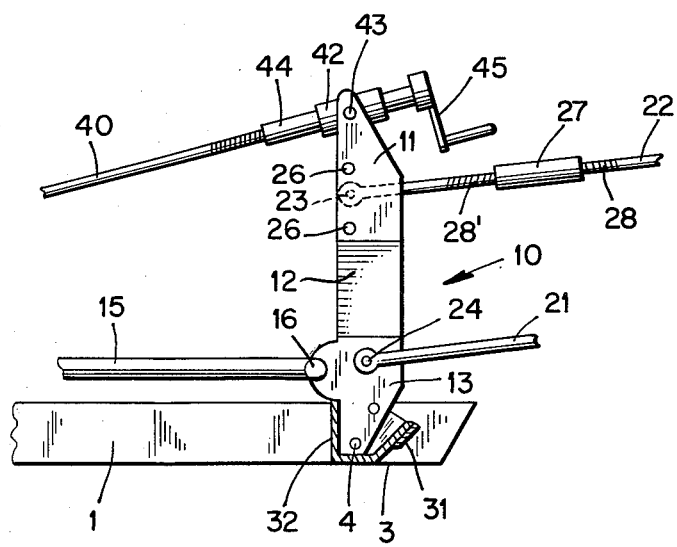
FIG. 3

LEVELER FRAME ATTACHED TO AN AGRICULTURAL TRACTOR

The invention relates to a drag leveler attached to an agricultural tractor and adapted for shaping plowed soil. It relates particularly to a drag leveler adapted to break hard clods and to smooth the soil by vibratory movement of its blades.

The known levelers for the above purpose comprise a heavy frame provided with several blade members, which is towed and dragged across a plowed field by a traction vehicle. These levelers are generally provided with tired wheels which can be lowered for the purpose of transporting the implement to another site along roads or tracks. The smoothing action of these heavy implements, while they are towed across a field, consists in shifting soil from higher ridges into hollows, in breaking the more brittle clods into small pieces and pushing the remaining, harder clods underneath.

The main drawback of the known implements is their heavy weight which requires a heavy and strong tractor for dragging them across the fields a further drawback being the need to provide extra road wheels for transporting them, and still another fault being their insufficient capacity for crushing hard lumps and earth clods.

The present invention has, therefore, as its object to provide a leveler of much lighter weight which should permit its attachment to a standard type agricultural tractor and its transport from site to site in high-lift position as performed by the conventional hydraulic holding and lifting equipment. The main object of the invention is to provide the leveler with means adapted to crush earth clods by vibrating action of its blades, thereby achieving a leveling performance hitherto only attained by much heavier implements.

The leveler, according to the present invention, is in the shape of a rectangular frame comprising two parallel lateral members extending in the direction of travel, which are interconnected by at least two transverse members, including a rear member and a front member both having forwardly and upwardly inclined working blade surfaces. The front member is positioned between the lateral members in two end pivots which permit the oscillation of the member about its horizontal longitudinal axis and, thereby, alteration of the angle of inclination of the blade surface with respect to the soil surface. The leveler is attached to the three-point-hitch of a tractor by means of an upstanding lever member, the bottom end of which is rigidly attached to the pivoted front member, while the ends of the three hitch arms are pivotally connected to the member at two spaced-apart levels. The top portion of the lever member is loosely connected to the rear portion of the leveler by means of a bar or cable, permitting lifting of the implement by the actuated hitch arms.

During trailing of the leveler frame behind the tractor, the hydraulic mechanism is inoperative permitting the arms to swing freely in their respective vertical planes and the frame to be pressed onto the soil by its own weight. While the tractor moves across the uneven ground, its front and rear wheels are alternately raised and lowered with regard to an ideal level plane, which movement causes the alternate forward and rearward movement of the respective upper and lower hitch arms. Since these are pivoted to the upstanding lever member the latter follows their movement and vibrates in forward and rearward motion together with the attached front member, whereby the angle of inclination of the blade surface changes continuously, causing the blade to pound the earth clods encountered, breaking and pulverizing them.

In a preferred embodiment of the leveler frame a second hinged transverse blade member is provided to the rear of, and at a distance from the front blade member, the two blade members being connected by hinged lever means in such a manner as to cause the second blade to vibrate at the same rate as the front blade.

At the end of the leveling operation the leveler frame is lifted off the ground by means of the hydraulically operated lift arms. Hereby the cable or bar connecting the top of the lever member with the rear of the frame is stretched and lifts the rear end at the same time as the front end.

The great advantage of the present implement is that its vibratory motion smoothes the soil at the same rate as a much heavier drag leveler of the conventional kind. This feature permits 1. the use of a lighter tractor, 2. the lifting off-ground of the frame by the three-point-hitch, and 3. ready transport to an alternative site.

Figure 1B:
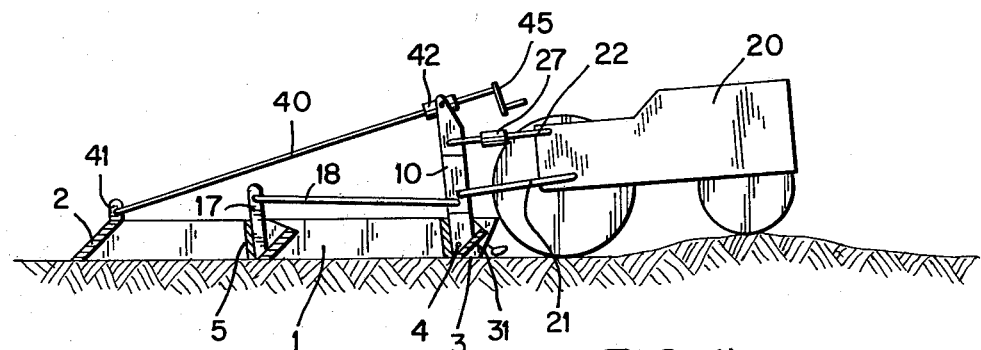
Figure 1C:
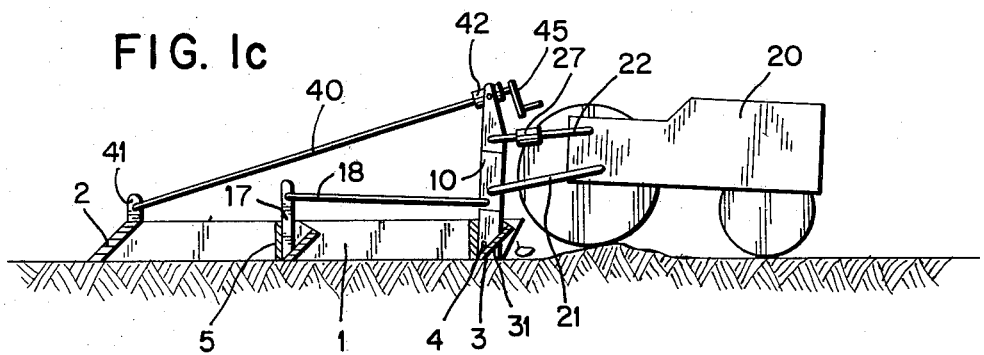

In the accompanying drawings which illustrate, by way of example, one embodiment of the invention, FIGS. 1a, 1b and 1c show a leveler frame attached to the three-point-hitch of a tractor and illustrate the position of the front blade at three different inclinations in accordance with the angle formed by the tractor with the horizontal ground level, FIG. 2 is a front view of the leveler frame, as seen from the tractor end, and FIG. 3 is a section along A—A of FIG. 2, showing the front blade and the lever member.

With reference to FIGS. 1, 2 and 3 of the drawings, a leveler frame comprises two lateral members 1 in the shape of channel irons with their flanges extending outwardly, the members being rigidly connected at their rear ends by a fixed transverse member 2, and at their front ends by an oscillating blade member 3, the latter being pivotally attached to the channels 1 by pins 4. The front blade member 3 is trough-shaped, comprising a front blade 31, a rear wall 32 as reinforcement, and two connecting plates 33 positioned in relation to the axis of the frame at a distance corresponding to the distance of the two lower lifting arms 21 of the tractor 20. A second oscillating transverse member 5—which is optional—is shown in FIG. 1 about halfway between the front and the rear member respectively. An upstanding lever member 10 is rigidly attached to the two connecting plates 33 of the front blade member forming an integral unit therewith. The member 10 comprises two central vertical bars 11 separated by a narrow gap and two downwardly diverging plates 12 each continued in a vertical section 13 which adjoin the two connecting plates 33 and are bolted thereto.

The rear ends of the two lower hitch arms 21 are pivotally connected to the vertical sections 13 by means of pins 24, while the rear end of the upper, single arm 22 is fastened between the two bars 11 by a pin 23. These bars are, for this purpose, provided with three pairs of holes 26 which permit the alternative positioning of the arm with a view to obtain different degrees of oscillation of the front blade member. The arm 22 is, in addition, provided with a screw coupling 27 and corresponding right-hand and left-hand screw-thread 28, 28' which permit altering the length of the arm and, thereby, the position of the lever member 10. A bar 40 is pivotally attached to the rear of the leveler frame by a pin 41 and to the top of the lever member by a mechanism which permits both swivelling action and adjustment of the length of this bar. This mechanism consists of a bush 42 held in the top portion 11 by two pins 43 which allows its oscillation about these pins. The end of the bar 40 is screw threaded and is inserted in a threaded sleeve 44, the latter being slidingly and rotatably positioned in the bush 42, to be rotated by a crank handle 45. Rotation of the crank moves the sleeve 44 in axial direction within the bush, thus shortening or lengthening the distance between the crank end and the rear end of the bar, its purpose being explained furtheron.

The second transverse member 5 is moved at the same rate as the front member by means of two connecting bars 15 attached at their front ends to the vertical sections 13 of the lever member 10 by pins 16. The rear ends of the bars are pivotally attached to the transverse member 5 through two upstanding arms 17 and two pins 18. The working of the leveler composed of the lever frame connected to the tractor by the slack lifting arms 21 and 22 is depicted in FIGS. 1a, 1b and 1c. FIG. 1a shows the movement of the implement across a completely smooth and even field, a feature never occurring in a ploughed field, to the contrary, a field consists, in reality, of small hollows, ridges and bumps. These are shown in FIGS. 1b and 1c, FIG. 1b showing the front wheels climbing over a ridge and 1c showing the rear wheels in a similar position. By the raising of the front wheels the upper arm 22 tilts the lever member to the rear and thereby changes the inclination of the front blade 31. In the case that a second member 5 is provided, this will similarly be tilted about its pivots. As soon as the front wheels have passed the ridge and the rear wheels climb over it (FIG. 1c), the lever member is tilted in forward direction, bringing the front blade down onto the lumps and clods which lie in its way, crushing and pulverizing them. During the oscillating motion of the lever member the bush 42 slides along the sleeve 44, while neither exerting any pulling force on the bar 40, nor through it into the rear end of the leveler frame.

It will be understood that the hollows and ridges in an actual ploughed field are not in the shape as depicted in the aforesdescribed drawings, but are very irregular and close together, so as to rock the tractor continuously, the latter transmitting the motion to the pivoted blade member or members. During progress of the implement the oscillating motion of the blade results in pounding and crushing of the earth clods and lumps which are comminuted and the soil is smoothed and loosened at the same time.

After leveling of a certain area has been completed the leveler frame is lifted off the ground by actuation of the hydraulic mechanism adapted to lift the two lower arms 21. In case the rear of the leveler frame hangs too low, it can be raised by operation of the crank 45. This is advantageously done even before starting to lift the frame off the ground.

The leveler frame is readily separated from the tractor which then can be used for other tasks. It is a great advantage of the present invention that it does not require any alteration to be made to the elements and arms of the three-point-hitch. The frame is of light weight, contrary to the weight of the existing heavy drag levelers, and it can be readily stored in upright position, thus taking up a minimum of space when not in use.

I claim:

1. A leveler frame adapted to be attached to a conventional three-point-hitch of an agricultural tractor comprising two parallel lateral members extending longitudinally and in the direction of travel, at least two transverse members interconnecting said lateral members and comprising a rear member rigidly connected to said lateral members and a front member pivotally attached to said lateral members by means of two end pivots so that said front member may oscillate about the longitudinal horizontal axis thereof, each of said transverse members having forwardly and upwardly inclined working blade surfaces and the angle of inclination of the working blade surface of said front member being variable according to the pivotal position of said front member, an upstanding lever member rigidly connected to said front member including means for connecting said lever member to the arms of the three-point-hitch at two spaced levels along said lever member, and sliding bar or cable means loosely connecting the distal end of said lever member to the rear of said leveler frame, whereby a front-to-back rocking of a drawing tractor causes oscillation of said front member without exertion of substantial force on said rear member through said sliding bar or cable means.

2. The leveler frame of claim 1, comprising a second oscillating member positioned to the rear of said front member and having a forwardly and upwardly inclined working blade surface, said second member being connected to said front member by hinged bar means adapted to urge said second member to oscillate at the same rate as said front member.

3. The leveler frame of claim 1, wherein said pivoted front member is through-spaced comprising an inclined front blade wall, a reinforcing rear wall and two vertical connecting plates positioned between said rear wall and said front blade wall, at a horizontal distance from each other corresponding substantially to the horizontal spacing of the two lower hitch arms of the tractor.

4. The leveler frame of claim 3, wherein said upstanding lever member comprises two parallel upstanding bars, separated by a gap, two downwardly diverging plates rigidly connected to said two bars, said diverging plates being, at their lower ends, continued in downward direction by two vertical plates connected to said connecting plates of said front member.

5. The leveler frame of claim 4, wherein the rear end of the upper arm of said three-point-hitch is pivotally fastened between said two upstanding bars of said lever member, and wherein the rear ends of the two lower arms of said three-point-hitch are pivotally fastened to said downwardly extending plates of said lever member.

6. The leveler frame of claim 5, wherein the length of said upper arm of said three-point-hitch is adjustable.

7. The leveler frame of claim 5, wherein at least three pairs of holes are provided in said two bars, permitting the fixation of said upper arm in either pair.

8. The leveler frame of claim 1, wherein a bar connecting the rear end of said leveler frame is screw-threaded in its front end and inserted into a rotatable threaded sleeve, said sleeve being axially movable in a bush which is pivotally connected to the top of said lever member, between said parallel bars.

* * * * *